Figure 1:
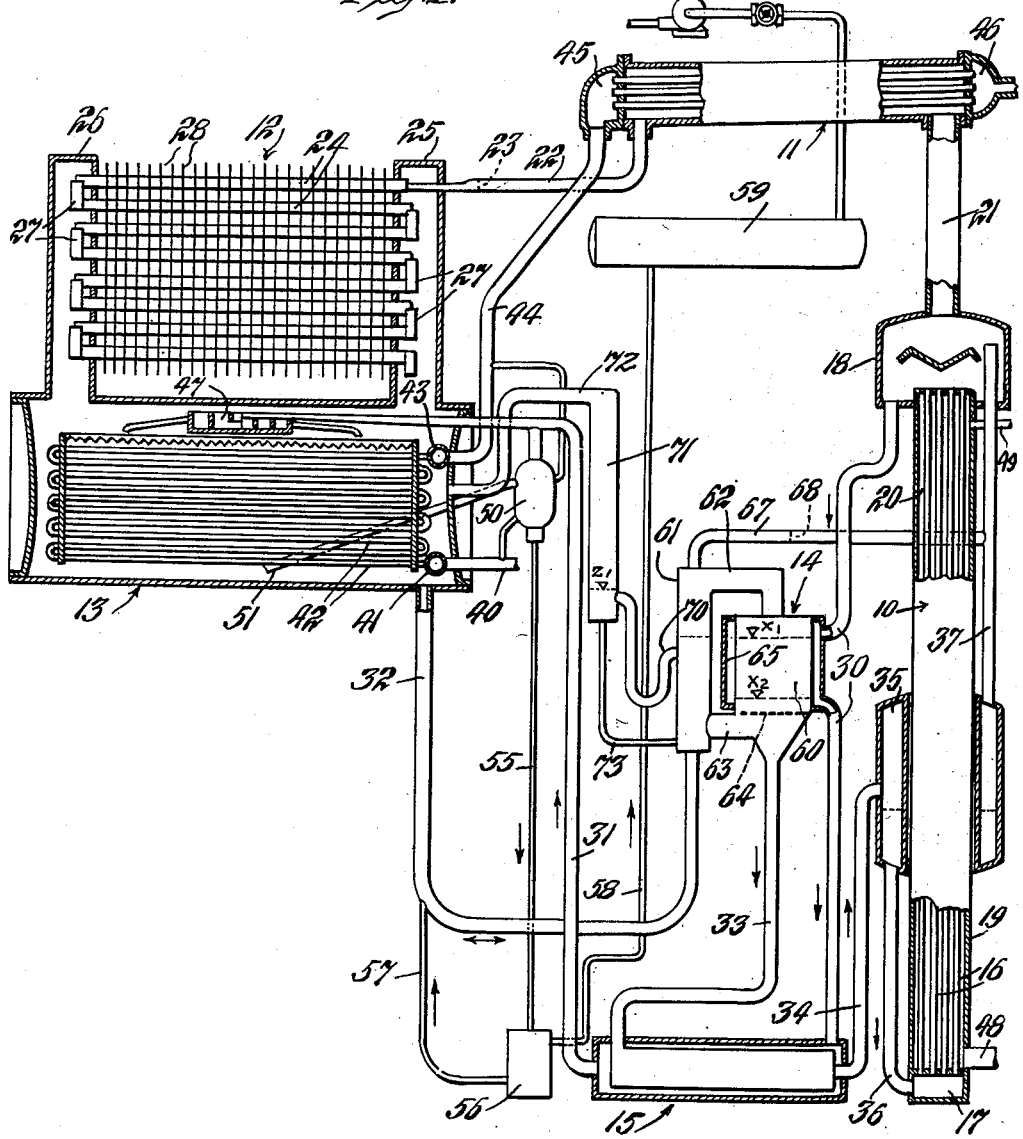

United States Patent Office 2,822,673
Patented Feb. 11, 1958

2,822,673
REFRIGERATION

Norton E. Berry, Newburgh, Ind., assignor, by mesne assignments, to Arkla Air Conditioning Corporation, a corporation of Delaware Application August 18, 1953, Serial No. 374,862

4 Claims. (Cl. 62—119)

This invention relates to refrigeration and more particularly to two pressure type absorption refrigerating systems that operate at relatively low pressures.

In a low pressure refrigerating unit where solution columns are used to balance the pressure between the high and low pressure sides, as for example in the lithium bromide-water unit, as illustrated and described in the United States patent to Albert R. Thomas et al. No. 2,301,232, the bottom of the absorber must always be a minimum height above the level of solution in the generator leveling chamber in order to assure gravity flow from the absorber at all times. This imposes certain minimum restrictions on the overall height of the unit and/or restricts the available reaction head for raising the solution in the generator by vapor-liquid lift action for flow to the absorber. In refrigerating units manufactured in accordance with the above Thomas et al. patent the absorber outlet is placed an appreciable distance above the solution level in the leveling chamber.

The above restriction can, of course, be obviated by means of a solution pump, which is undesirable, and this restriction can be largely avoided by means of some type of "transfer vessel." The usual "transfer vessel" has the disadvantage of requiring a float, or some similar device, and a relatively complicated valving arrangement. For high pressure systems there is also an appreciable loss in efficiency due to the uncondensed refrigerant vapor which must necessarily be lost from the "high side" to the "low side" in order to operate the transfer vessel.

However, in a very low pressure system such as the lithium bromide-water system of the above Thomas et al. patent, the specific volume of the vapor is so great that the loss in efficiency can be reduced readily to a negligible amount. This then also presents the possibility that the "transfer vessel" arrangement can be simplified at the expense of some increase in the amount of "by-passed" vapor over the minimum requirement, without appreciably affecting the efficiency of the system. This invention is directed to a method of and apparatus for accomplishing the latter result.

Briefly, in accordance with this invention, a transfer vessel is arranged in the solution circuit between the generator and absorber in a manner that absorption solution weak in refrigerant that has been lifted from the generator to the vapor separator by vapor-liquid lift action flows continuously by gravity to the absorber. Whereas, absorption solution strong in refrigerant flows intermittently from the absorber to the transfer vessel and from there to the generator, without the aid of any movable parts, such as pumps, valves, floats or the like within the working media circuits, and without the aid of any auxiliary heating equipment. The transfer of strong solution from the absorber to the generator is intermittent. However, the refrigerating system operates continuously and, so long as desired, produces continuous refrigeration. With applicant's arrangement the heretofore optimum height of a two-pressure gravity-flow type of absorption refrigerating unit is appreciably reduced.

In the accompanying drawings, this invention is applied to effect a lowering of the absorber and thus a decrease in the overall unit height. In the case of a direct fired refrigerating unit, as illustrated and described in my United States Patent No. 2,625,800, this invention may be used instead to effect an increase in the available reaction head and thus facilitate the application of a vertical direct fired generator which would have some distinct advantages over the horizontal generator now used on said unit.

Figure 2:
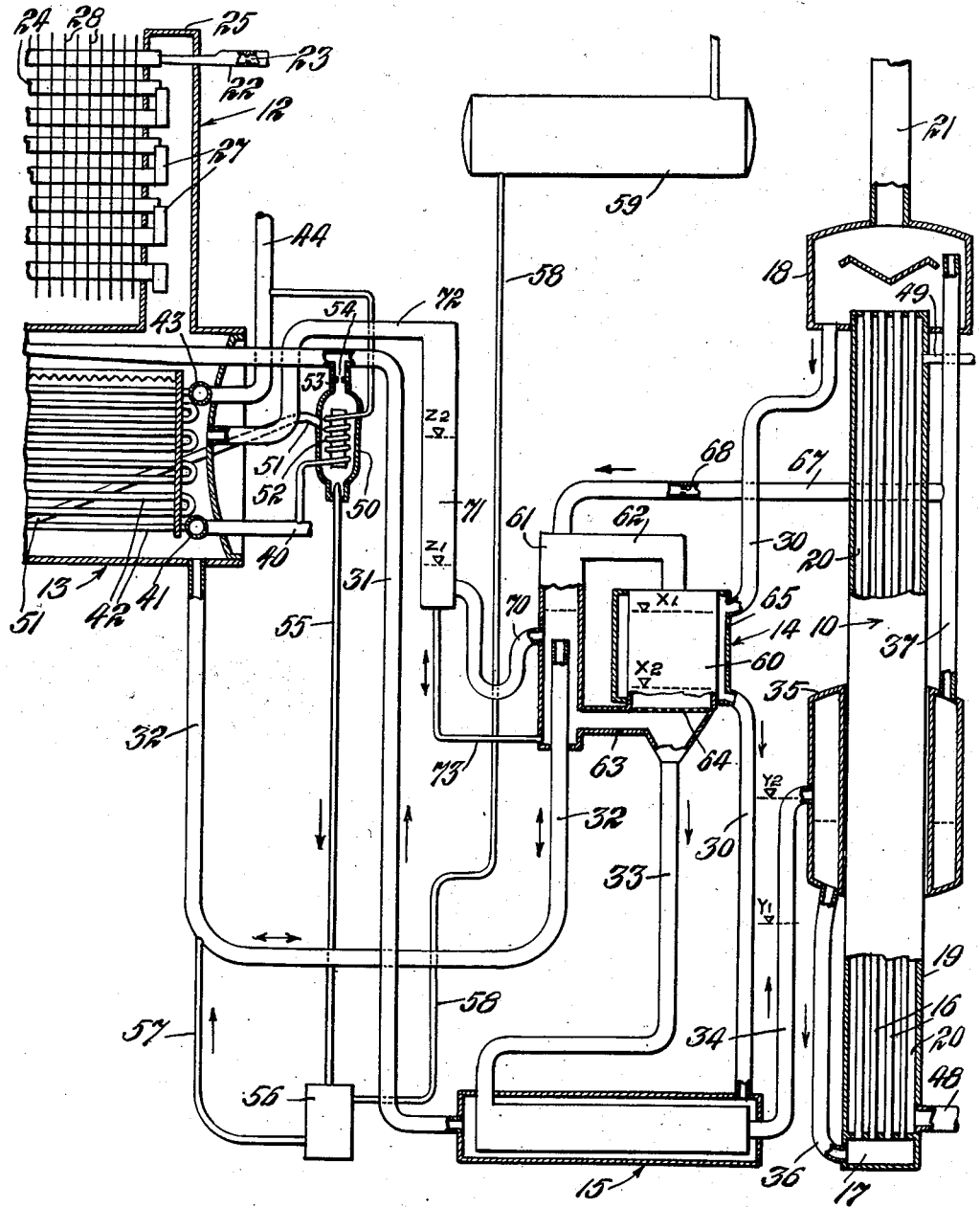

The invention together with its objects and advantages is set forth in more technical detail in the following description and accompanying drawings, wherein:

Fig. 1 is a diagrammatic illustration of a refrigerating system incorporating this invention; and Fig. 2 is an enlarged diagrammatic illustration partly in section of parts of the refrigerating system shown in Fig. 1.

The drawings show the present invention applied to an absorption refrigeration system for conditioning air, which system is of the type illustrated and described in the Thomas et al. patent, referred to above. The system operates below atmospheric pressure and utilizes water as the refrigerant and a halide salt solution such as lithium chloride or lithium bromide as the absorbent.

The refrigerating system comprises a generator 10, a condenser 11, an evaporator 12, an absorber 13, a liquid transfer device 14, and a heat exchanger 15, all interconnected in a manner to provide paths of flow for the circulation of the refrigerant and absorbent through the system. The generator and condenser constitute the high pressure side of the system, and the evaporator and absorber constitute the lower pressure side. The pressure difference between the condenser and evaporator is balanced by a pressure-reducing orifice, while the pressure difference between the generator and absorber is balanced by liquid columns, to be referred to in more detail hereinafter.

The generator 10 includes a series of upright tubes 16 connected at their lower ends to an inlet chamber 17 for absorption solution and connected at their upper ends to a separating chamber 18. Surrounding the tubes 16 is a shell 19 providing a heating chamber 20 therein. The separating chamber 18 is connected to the condenser 11 by a conduit 21 and the condenser, in turn, is connected to the evaporator 12 by a conduit 22 having an orifice 23 therein. The orifice constitutes a path of flow for liquid refrigerant while permitting a limited flow of refrigerant vapor from the condenser 11 to the evaporator 12, as will later be described in detail.

The evaporator 12 comprises a series of substantially horizontal tubes 24 extending between a pair of headers 25 and 26. Liquid refrigerant supplied by conduit 22 to one end of the uppermost tubes 24 in the header 25 flows therethrough by gravity and is collected in a trough 27 in the header 26 for directing it into the end of the next lowermost tube. Each tube 24 has a trough 27 for collecting refrigerant from the next adjacent tube and delivering it for flow therethrough by gravity so that the refrigerant flows through each tube successively from the top to the bottom of the evaporator. The evaporator 12 communicates with the absorber 13 through the passages of headers 25 and 26 which open directly into the top of the absorber. The headers 25 and 26 together with the top of the absorber 13 constitute a passageway for directing a stream of air to be conditioned over the tubes 24 and between a series of fins 28 placed in thermal contact with the tubes to transfer heat from the air to the refrigerant in the tubes.

Absorption solution weak in refrigerant or, in other words, a concentrated salt solution flows from the separating chamber 18 to the top of the absorber 13 in a path of flow including a conduit 30, the heat exchanger 15, and a conduit 31. Absorption solution strong in refrigerant or, in other words, dilute solution flows from the bottom of the absorber to the inlet chamber 17 of the generator 10 in a path of flow including a conduit 32, the liquid transfer device 14, a conduit 33, the heat exchanger 15, a conduit 34, a leveling vessel 35 and a conduit 36. A vent conduit 37 connects the leveling vessel 35 with the separating chamber 18. The leveling vessel 35 is of such cross sectional area that the intermittent dumping of absorption solution thereinto, to be described in more detail hereinafter, does not appreciably effect the working level of solution therein.

The absorber 13 and condenser 11 are cooled by cooling water from any suitable source, such as a city main, a cooling tower, or the like. The cooling water is supplied from a conduit 40 to a header 41 which supplies the cooling water to a bank of pipe coils 42 in the absorber 13. Cooling water from the coils 42 is delivered to a header 43 and from the header it flows through a conduit 44 to an inlet chamber 45 of the condenser 11. Cooling water from the condenser is discharged from an outlet chamber 46 to a waste pipe, not shown. Concentrated salt solution delivered to the absorber 13 through the conduit 31 is divided into droplets by a liquid distributor 47 and the droplets trickle by gravity over the banks of pipe coils 42.

The generator 10 is heated by steam supplied through a conduit 48 from any suitable source such as a boiler, not shown. The upper end of the heating chamber 20 of the generator 10 is vented to the atmosphere by a vent pipe 49 and condensate drains from the lower end of the heating chamber through a drain pipe, not shown. Thus, steam is supplied to the heating chamber 20 of the generator 10 at atmospheric pressure and at a predetermined constant temperature corresponding to atmospheric pressure and its heat is transferred through the tubes 16 to heat the absorption solution therein and expel refrigerant vapor therefrom. The rate at which refrigerant vapor is expelled from the absorption solution in the generator 10 is dependent upon the amount of steam supplied to the heating chamber 20. The conduit 22 between the condenser 11 and evaporator 12 is so constructed and arranged as to permit the flow of liquid refrigerant as it is condensed in the condenser and a limited flow of non-condensable gases with refrigerant vapor in separate continuous streams. The conduit 22 has a restriction in the form of the orifice 23 therein. The orifice 23 is larger than that necessary to pass all of the liquid refrigerant condensed in the condenser 11 but is small enough to restrict the flow of vapor therethrough to an amount such that no appreciable loss of refrigerant is incurred.

Any non-condensable gases occurring in the condenser 11 will flow through the conduit 22 and orifice 23 to the evaporator 12 with the refrigerant vapor. The non-condensable gases flowing through the first tubes 24 of the evaporator 12 will enter the header 26 and be swept with the refrigerant vapor into the absorber 13. As the non-condensable gases will not be appreciably absorbed they will accumulate at the bottom and center of the absorber where there is the least turbulence. Non-condensable gases in the absorber will also blanket that portion of the heat transfer surfaces which they cover and a purging device, of the type described and claimed in United States patent to Lowell McNeely No. 2,473,384, is provided for constantly withdrawing the non-condensable gases from the absorber 13.

As illustrated in Fig. 2 of the drawings, the purging device comprises an auxiliary absorber vessel 50 having a suction tube 51 extending into the main absorber 13. A coil 52 in the auxiliary absorber vessel 50 is connected between the conduits 40 and 44 to flow cooling water therethrough and a conduit 53, having an orifice 54 therein, connects the top of the auxiliary absorber vessel to conduit 31 to trickle a limited quantity of absorption solution weak in refrigerant over the cooling coil 52. A vertical tube 55 is connected between the vessel 50 and a gas trap 56, and the gas trap is connected at its lower end by a conduit 57 to the conduit 32 and at its upper end by a conduit 58 to a gas storage vessel 59. The auxiliary absorber vessel 50 draws refrigerant vapor and non-condensable gases from the main absorber 13 and the refrigerant vapor is absorbed in the solution flowing therethrough. The tube 55 exhausts the solution and non-condensable gases in alternate slugs into the gas trap 56 and the solution flows through conduit 57 into conduit 32, while the non-condensable gases ascend through the riser tube 58 and are collected and stored in the storage vessel 59. When the unit shuts down, any non-condensable gases contained in the gas trap 56 are returned through the tube 55 and the auxiliary absorber 50 to the main absorber 13, as described in the above United States Patent No. 2,473,384 to Lowell McNeely.

In accordance with my invention, the liquid transfer device 14 includes a main transfer vessel 60 and an auxiliary transfer vessel 61, connected at the top and bottom by conduits 62 and 63, respectively. Transfer vessel 60 is provided with a perforated plate 64 in the bottom thereof and is surrounded by a solution jacket 65, which jacket forms a part of conduit 30 leading from the separating chamber 18 to the outer passage of the heat exchanger 15, and conduit 33 connects the bottom of vessel 60 to the inner passage of the heat exchanger. A vapor conduit 67, provided with an orifice 68, connects the vent conduit 37 to the top of the auxiliary transfer vessel 61, and conduit 32, leading from the bottom of the absorber 13, opens into the auxiliary transfer vessel intermediate the top and bottom thereof. A conduit 70 in the form of a liquid trap is connected at one end to an intermediate portion of the auxiliary transfer vessel 61 and the opposite end of this conduit opens into a lower portion of a standpipe 71, which standpipe is vented to the absorber 13 by a conduit 72. A conduit 73, of relatively small diameter, connects the bottom of the standpipe 71 to the bottom of the auxiliary transfer vessel 61.

One embodiment of the invention having now been described in detail the mode of operation is explained as follows:

When steam is supplied to the chamber 20 of the generator 10 heat is transmitted through the tubes 16 of the generator to expel refrigerant vapor from the refrigerant-absorbent solution therein and the concentrated solution is lifted in the tubes by vapor lift action. The refrigerant vapor then flows through the separating chamber 18 and conduit 21 into the condenser 11 where it is condensed to a liquid. The absorption solution in the chamber 18 flows by gravity through the upper part of conduit 30, the jacket 65 around the transfer vessel 60, the lower part of conduit 30, the outer passage of the heat exchanger 15, and conduit 31 into the distributor 47 at the top of the absorber 13 where the solution is divided into droplets and trickles over the bank of cooling coils 42. Liquid refrigerant and a small amount of refrigerant vapor flow concurrently through the conduit 22 and orifice 23 from the condenser 11 to the evaporator 12. As the stream of liquid refrigerant requires a cross sectional area constituting only a part of the area of the orifice 23 to freely flow therethrough, the refrigerant vapor will flow through the remaining part of the orifice due to the difference in pressure in the condenser 11 and evaporator 12.

The liquid refrigerant entering the uppermost tubes 24 of the evaporator 12 flows by gravity through the tubes successively and is evaporated by the transfer of heat from the stream of air flowing over the tubes. Refrigerant vapor caused by the evaporation of liquid refrigerant in the tubes 24 of the evaporator 12 flows through the headers 25 and 26 into the absorber 13 where it is absorbed in the absorption solution trickling over the bank of cooling coils 42 in the absorber. Absorption solution accumulating in the bottom of the absorber 13 then flows through conduit 32, the liquid transfer device 14, conduit 33, heat exchanger 15, conduit 34, leveling vessel 35, and conduit 36 to the inlet chamber 17 at the bottom of the generator 10. Simultaneously, absorption solution flows from conduit 31 and orifice 54 through the auxiliary absorber 50 to absorb refrigerant vapor and draw non-condensable gases from the main absorber 13. The absorption solution and non-condensable gases in the auxiliary absorber 50 then flow in alternate slugs through the tube 55 into the gas trap 56, and from there the gases rise through the tube 58 into the storage vessel 59 and the absorption liquid flows through conduit 57 into conduit 32.

Returning now to the flow of absorption solution from the absorber 13 through the liquid transfer device 14 to the generator 10. Starting at the beginning of a "dumping" cycle with the solution level in vessels 60 and 61 at its highest point, indicated by $X_1$, the vapor pressure above the absorption solution in these vessels will have been reduced by venting and absorption of vapor to a value not much above that in the absorber 13 so that solution will have flowed by gravity from the absorber through conduit 32 and into the transfer vessels up to the level $X_1$. This will be discussed in more detail in the subsequent description of the "filling" cycle. The solution in conduit 34 leading to the leveling vessel 35 will be at a level $Y_1$ such that the difference in height between this level and that of the bottom of the absorber 13 will represent, as hydrostatic head, the difference between the high and low side pressures in the system. The solution in standpipe 71 will be at level $Z_1$, or substantially the same as in the absorber 13. As vapor from the generator continues to pass through conduit 67 and orifice 68, the vapor pressure over the liquid in the transfer vessels is increased and the liquid level in both vessels 60 and 61 will start to fall. The immediate solution discharged from these vessels will pass through conduit 32 and back into the absorber until the solution level falls to the top of the conduit 32 as it extends into the auxiliary vessel 61.

As the pressure further increases in the transfer vessels 60 and 61, the solution level in the conduit 32 will fall and that in conduit 34 will rise to provide the required hydrostatic balance between the high and low pressure sides of the system until finally solution is discharged from the level $Y_2$ at the top of conduit 34 into the leveling vessel 35. At the same time the solution level in standpipe 71 will rise from the level $Z_1$ to the level $Z_2$ to provide the proper hydrostatic balance. It is to be noted that $Y_2-Y_1=Z_2-Z_1$, in other words, $Z_1-Y_1=Z_2-Y_2$. As the pressure in the transfer vessels continues to increase, the level $X_1$ will continue to fall and solution will be forced out and discharged through conduit 33, heat exchanger 15, and conduit 34 into the leveling vessel 35 until the level in the transfer vessels reaches approximately that indicated by $X_2$. At this point, vapor will begin to flow through trap 70 and this trap will be essentially cleared of solution causing the pressure in the transfer vessels to decrease.

As the pressure decreases in the transfer vessels, the solution level in conduit 32 leading to transfer vessel 61 will rise and that in conduit 34 will fall, so that solution is no longer discharged into the leveling vessel 35. When the level in conduit 32 finally rises to the top of this conduit, solution will then spill into vessel 61 and will absorb some of the vapor present in this transfer vessel. At the same time some vapor will continue to vent through trap 70 to further facilitate the drop in pressure. Solution will also return from the standpipe 71 through conduit 73 into the bottom of transfer vessel 61. The principal function of the smaller transfer vessel 61 is to keep the extended surface of the solution in transfer vessel 60 as quiet as possible and thereby minimize absorption of refrigerant vapor since absorption of such vapor results in lost unit efficiency. The use of the smaller vessel 61 minimizes this absorption of vapor but allows the amount of absorption needed for operation.

The solution entering through conduit 32 will then begin to fill vessels 61 and 60 simultaneously, with the solution entering vessel 60 through the perforated plate 64 at the bottom thereof. The purpose of this plate is to break up the flow of solution so as to cause as little disturbance of the solution surface as possible. When the level in vessel 61 reaches the point where solution can flow into trap 70, this trap will fill with liquid and vapor will no longer vent from the transfer vessel. The vapor passing through orifice 68 from the generator will then collect in the transfer vessels and cause a rise in pressure therein. Some of the vapor will be absorbed at the solution surface, but this will result in a layer of lighter dilute solution on top of the main body of solution, which will soon prevent further absorption. The heating of the walls of the transfer vessel 60 by hot solution passing through the jacket 65 also helps to prevent absorption and condensation of vapor on the walls of this vessel. When the pressure has increased sufficiently, the influx of solution through conduit 32 will stop, the levels in vessels 60 and 61 will again start down and the cycle will have been completed.

The resultant will have been the transfer of solution from the absorber, at the low side pressure, to the leveling vessel at the high side pressure and at a level higher than could have heretofore been attained by gravity flow; all without the aid of any movable parts, such as pumps, valves, floats or the like within the working media circuits. In fact, with applicant's invention, the working media circuits are at all time in open communication one with the others. This is done at the expense of some generator vapor which is vented from the transfer vessel to the low side and some additional vapor which is absorbed by the solution. This represents a loss in cooling capacity and efficiency since this vapor is not condensed and used as refrigerant. However, with a low pressure system as disclosed herein this loss in efficiency is negligible.

Without further description, it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. In an absorption refrigerating system of the two-pressure type, a generator, a condenser, an evaporator, an absorber and conduits interconnecting said elements for flow of refrigerating medium and absorption solution, and means included in said conduits for transferring strong solution from the absorber to the generator, said means including a transfer vessel connected at all times in open communication with the absorber and the generator to receive strong solution from the absorber and to deliver such solution to the generator, a vent conduit including a liquid trap between the transfer vessel and the absorber for reducing the pressure in said vessel to thereby cause solution to flow by gravity from the absorber to said vessel and a vapor conduit open at all times between the transfer vessel and the generator for increasing the pressure on solution in said vessel to thereby cause such solution to flow therefrom by gravity to the generator.

2. In an absorption refrigerating system of the two-pressure type, a generator, a condenser, an evaporator, and an absorber, and a transfer vessel connected between the absorber and the generator, a first conduit constructed to form a first liquid trap for flow of strong solution between the absorber and the transfer vessel, a second conduit constructed to form a second liquid trap for flow of vapor from the transfer vessel to the absorber, a third conduit constructed to form a liquid trap for flow of strong solution from the transfer vessel to the generator, and a fourth conduit connected between the generator and the transfer vessel for flow of vapor therethrough, each of said conduits being always in open communication with and between the respective elements to which they are connected, the construction and arrangement being such that vapor flowing through said fourth conduit to the transfer vessel increases the pressure on solution therein to the extent that solution is transferred therefrom through the third conduit to the generator and solution is removed from the liquid trap in the second conduit whereupon the pressure in the transfer vessel is decreased to the point that strong solution flows by gravity from the absorber to the transfer vessel.

3. A system adapted for use as an absorption type refrigeration circuit including a generator, a condenser, an evaporator, an absorber, conduits interconnecting said elements for circulation of refrigerant fluid and absorption liquid, certain of said conduits providing fluid flow control for maintaining a pressure differential between the generator and condenser on the high side and the evaporator and absorber on the low side during operation, said conduits also including a transfer vessel in the path of flow for absorption liquid to the high side, connections for flow of vapor from the high side through said transfer vessel during operation, and a liquid trap so constructed and arranged as to alternately stop and start said flow of vapor.

4. A system adapted for use as an absorption type refrigeration circuit including a generator, a condenser, an evaporator, an absorber, conduits interconnecting said elements for circulation of refrigerant fluid and absorption liquid, certain of said conduits providing fluid flow control for maintaining a pressure differential between the generator and condenser on the high side and the evaporator and absorber on the low side during operation, said conduits also including a transfer vessel in the path of flow for absorption liquid from the low side to the high side, connections for continuous flow of vapor from the high side to said transfer vessel during operation, and a liquid trap to alternately block and permit flow of vapor from said transfer vessel to the low side.

References Cited in the file of this patent

UNITED STATES PATENTS

| | | |
|---|---|---|
| 146,277 | Prall | Jan. 6, 1874 |
| 462,551 | Hill | Nov. 3, 1891 |
| 987,475 | Martin | Mar. 21, 1911 |
| 1,796,410 | Schurtz | Mar. 17, 1931 |
| 1,905,308 | Schurtz | Apr. 25, 1933 |
| 2,112,537 | Kuenzli | Mar. 29, 1938 |
| 2,237,302 | Flukes | Apr. 8, 1941 |
| 2,263,067 | Burggrabe | Nov. 18, 1941 |
| 2,339,814 | Roth | Jan. 25, 1944 |
| 2,341,188 | Midnight | Feb. 8, 1944 |
| 2,552,071 | Terrill | May 8, 1951 |
| 2,653,454 | Buchel | Sept. 29, 1953 |

FOREIGN PATENTS

| | | |
|---|---|---|
| 317,336 | Great Britain | Aug. 14, 1929 |